(12) United States Patent
Missman et al.

(10) Patent No.: US 8,033,389 B2
(45) Date of Patent: Oct. 11, 2011

(54) CONVEYOR CHAIN HAVING A LOW FRICTION LINER

(75) Inventors: Kenneth D. Missman, Riverside, CA (US); Saul Murillo, Santa Ana, CA (US); Brad Haywood, Laguna Niguel, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 522 days.

(21) Appl. No.: 12/133,741

(22) Filed: Jun. 5, 2008

(65) Prior Publication Data

US 2008/0304777 A1 Dec. 11, 2008

Related U.S. Application Data

(60) Provisional application No. 60/933,285, filed on Jun. 5, 2007.

(51) Int. Cl.
*B65G 17/38* (2006.01)
(52) U.S. Cl. .............. 198/851; 59/5; 474/212
(58) Field of Classification Search ............... 198/850, 198/851, 852, 853; 59/4, 5, 8; 474/206, 474/207, 212, 217; 464/49
See application file for complete search history.

(56) References Cited

U.S. PATENT DOCUMENTS

| 3,582,166 | A | | 6/1971 | Reising |
|---|---|---|---|---|
| 4,926,529 | A | | 5/1990 | Hosmer |
| 5,549,194 | A | * | 8/1996 | Dag .............................. 198/851 |
| 5,667,442 | A | * | 9/1997 | Tanaka ............................... 59/5 |
| 5,745,974 | A | * | 5/1998 | Tanaka ............................ 29/458 |
| 5,950,416 | A | * | 9/1999 | Kerner et al. ......................... 59/5 |
| 6,344,426 | B1 | * | 2/2002 | Hata et al. ..................... 501/103 |
| 6,978,886 | B2 | * | 12/2005 | Karnes ........................... 198/852 |
| 2003/0177752 | A1 | | 9/2003 | Nakagawa |

FOREIGN PATENT DOCUMENTS

GB    1572738 A    8/1980

OTHER PUBLICATIONS

Search report dated Oct. 16, 2008.

* cited by examiner

*Primary Examiner* — James R Bidwell
(74) *Attorney, Agent, or Firm* — Michaud-Kinney Group LLP

(57) ABSTRACT

A conveyor chain including a chain pin having an exterior surface; a bearing having a generally tubular body portion having an exterior surface and an interior surface, the chain pin disposed in the generally tubular body portion of the bearing so that the interior surface of the bearing surrounds the exterior surface of the chain pin; and a low friction liner material secured to a surface selected from the exterior surface of said chain pin, the interior surface of the bearing, the exterior surface of the bearing, or combinations thereof.

11 Claims, 9 Drawing Sheets

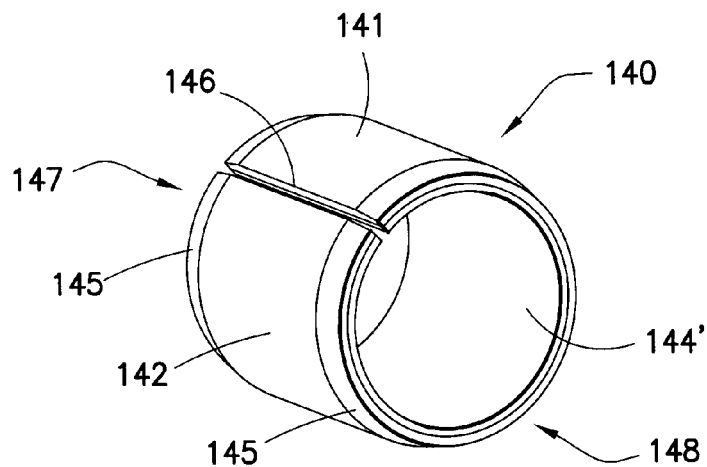
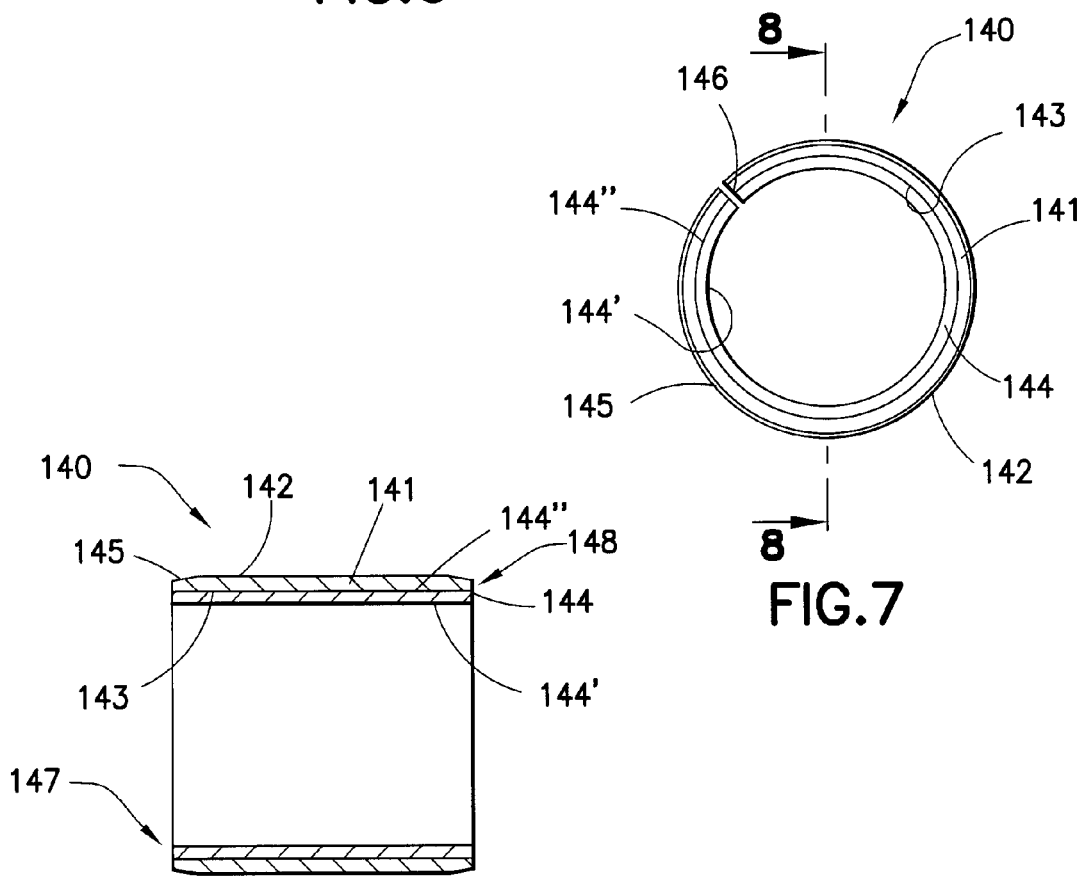

US 8,033,389 B2

CONVEYOR CHAIN HAVING A LOW FRICTION LINER

CROSS-REFERENCE TO RELATED APPLICATION

This application claims the benefit of U.S. provisional application No. 60/933,285, filed Jun. 5, 2007, the contents of which are incorporated herein by reference in their entirety.

FIELD

The disclosed subject matter is generally directed to a conveyor chain and is more specifically directed to a conveyor chain having a low friction liner disposed on one or more of a bearing surface, a chain pin surface, and a link pin surface.

BACKGROUND

Conveyor chain is used in conveyor systems in many industries including, but not limited to food processing, packaging, canning, bottling and warehouse product transfer. Typically, metal conveyor chain is used to move a particular product along a conveyor path.

It is known to provide a conveyor chain 10 as shown in FIGS. 1 and 2 which illustrates a portion of the conveyor chain 10 including two roller links 20 coupled by a connecting link 30. In FIGS. 1 and 2, components are shown with exaggerated spacing therebetween for illustration purposes. Each of the roller links 20 include two rollers 21 having an exterior surface 22 for supporting the product to be conveyed and an interior surface 23. Each roller link 20 includes two chain pins 24 having exterior surfaces 25 and chain pin bores 26 extending therethrough. Two chain pins 24 are disposed between parallel facing chain plates 27. In particular, the exterior surfaces 25 of the chain pins 24 engage respective chain plate bores 28 formed in the chain plates 27. One of the rollers 21 is mounted for rotation on each of the chain pins 24 such that the interior surface 23 and the exterior surface 25 slidingly engage one another. The roller links 20 are pivotally coupled to one another by the connecting link 30. In particular, the connecting link 30 includes a link pin 31 having a link pin exterior surface 32 and a pair of parallel facing link plates 33 each having two link pin bores 34 disposed therein. The parallel facing link plates 33 are positioned on opposing sides 29A and 29B of the roller link 20 such that chain plate bores 28 are coaxial with respective link pin bores 34. The link pin 31 extends through the chain pin bore 26 and the chain plate bore 34. Opposing ends of the link pins 31 are coupled to the parallel facing link plates 33 by engagement of the link pin exterior surface 32 with the chain pin bore 26.

It is known to provide a lubricant such as grease or oil between the interior surface 23 and the exterior surface 25 and between the link pin exterior surface 32 and the chain pin bore 26 to reduce wear. It is also known to use bushings manufactured from bronze, polytetrafluoroethylene (PTFE) and lead between sliding components in an effort to reduce friction.

Lubrication of chain components with lubricants such as grease and oil can increase maintenance costs and cause contamination of the products being conveyed. In addition, control and disposal of lubricants involve complex and costly procedures derived from environmental laws. Therefore, there has been a growing demand to reduce or eliminate the use of lubricants such as grease and oil in chain conveyors.

Use of bronze, PTFE and lead bushings in chain conveyors has been problematic because they result in reduced load carrying capability, reduced chain life, and limited material compatibility. Thus, there is a need to provide a bearing for chain conveyors that minimizes the need for periodic lubrication and withstands high conveyor loads.

SUMMARY

In one aspect, the present invention resides in a conveyor chain having a chain pin having an exterior surface, a bearing having a generally tubular body portion having an exterior surface and an interior surface, and a low friction liner material secured to a surface selected from the exterior surface of the chain pin, the interior surface of the bearing, the exterior surface of the bearing, or combinations thereof. The chain pin is disposed in the generally tubular body portion of the bearing so that the interior surface of the bearing surrounds the exterior surface of the chain pin.

In another aspect, the present invention resides in a conveyor chain having a chain pin having an exterior surface and a bearing. The chain pin is disposed between two parallel facing chain plates, each of the parallel facing chain plates having a bore adapted to receive opposing ends of the chain pin. The bearing has a generally tubular body portion defining an exterior surface of the bearing and an interior surface of the bearing. The chain pin is disposed in the generally tubular body portion of the bearing. The bearing comprises a low friction liner material secured to one of the exterior surface of the chain pin, the exterior surface of the bearing, the interior surface of the bearing, or combinations thereof.

In another aspect, the present invention resides in a bearing. This bearing includes a generally tubular body portion defining an exterior surface of the bearing and an interior surface of the bearing and a low friction liner material secured to the interior surface of the bearing or the exterior surface of the bearing. The low friction liner material includes polytetrafluoroethylene (PTFE) and a material interwoven with the PTFE. This material is selected from a glass material, a polyester material, or combinations thereof.

In yet another aspect, the present invention resides in a method of manufacturing a low friction conveyor chain. This method includes the steps of providing a chain pin with an exterior surface; disposing the chain pin in a generally tubular body portion of a bearing, the generally tubular body portion defining an exterior surface of the bearing and an interior surface of the bearing; and securing a low friction liner material to one of the exterior surface of the chain pin, the interior surface of the bearing, the exterior surface of the bearing, or combinations thereof, thereby manufacturing a low friction conveyor chain.

BRIEF DESCRIPTION OF THE DRAWINGS

FIG. 6 is a perspective view of a bearing.

FIG. 7 is a front view of the bearing of FIG. 6.

FIG. 8 is a cross sectional view of the bearing taken along line 8-8 of FIG. 7.

DETAILED DESCRIPTION

Figure 1:
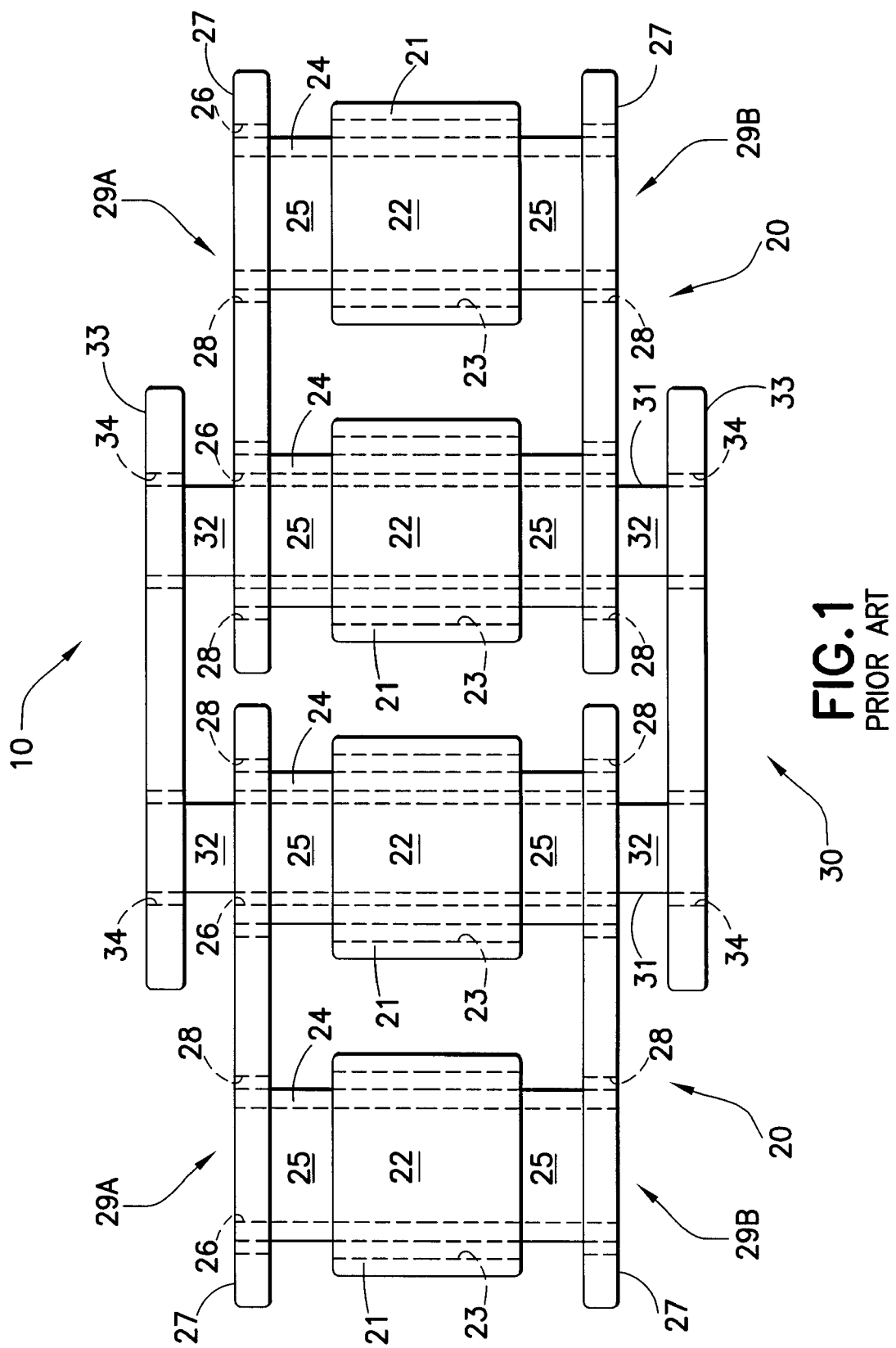
FIG. 1 is a top view of a portion of a prior art conveyor chain.
Figure 2:
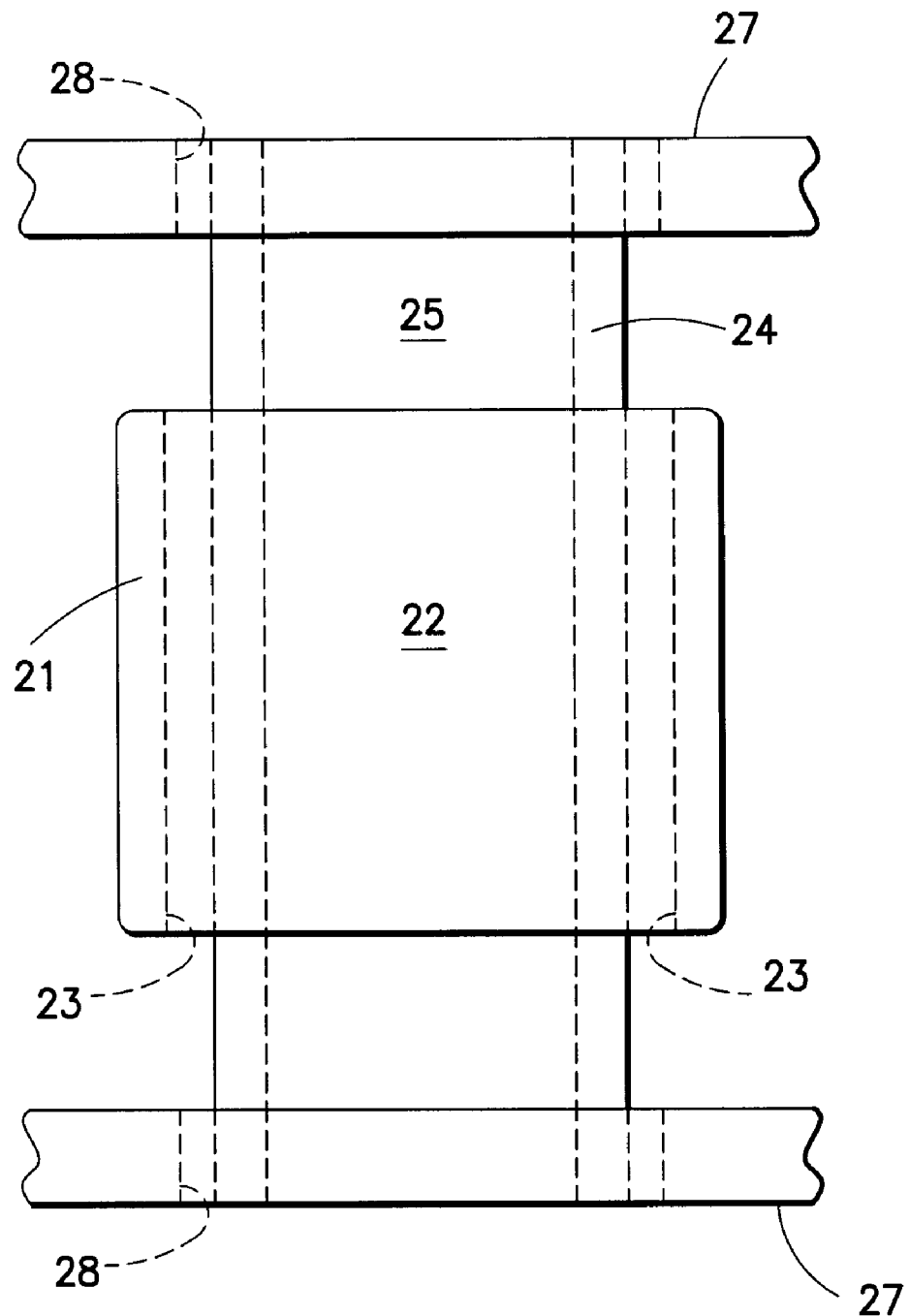
FIG. 2 is a top view of a portion of the prior art conveyor chain roller of FIG. 1.
Figure 3:
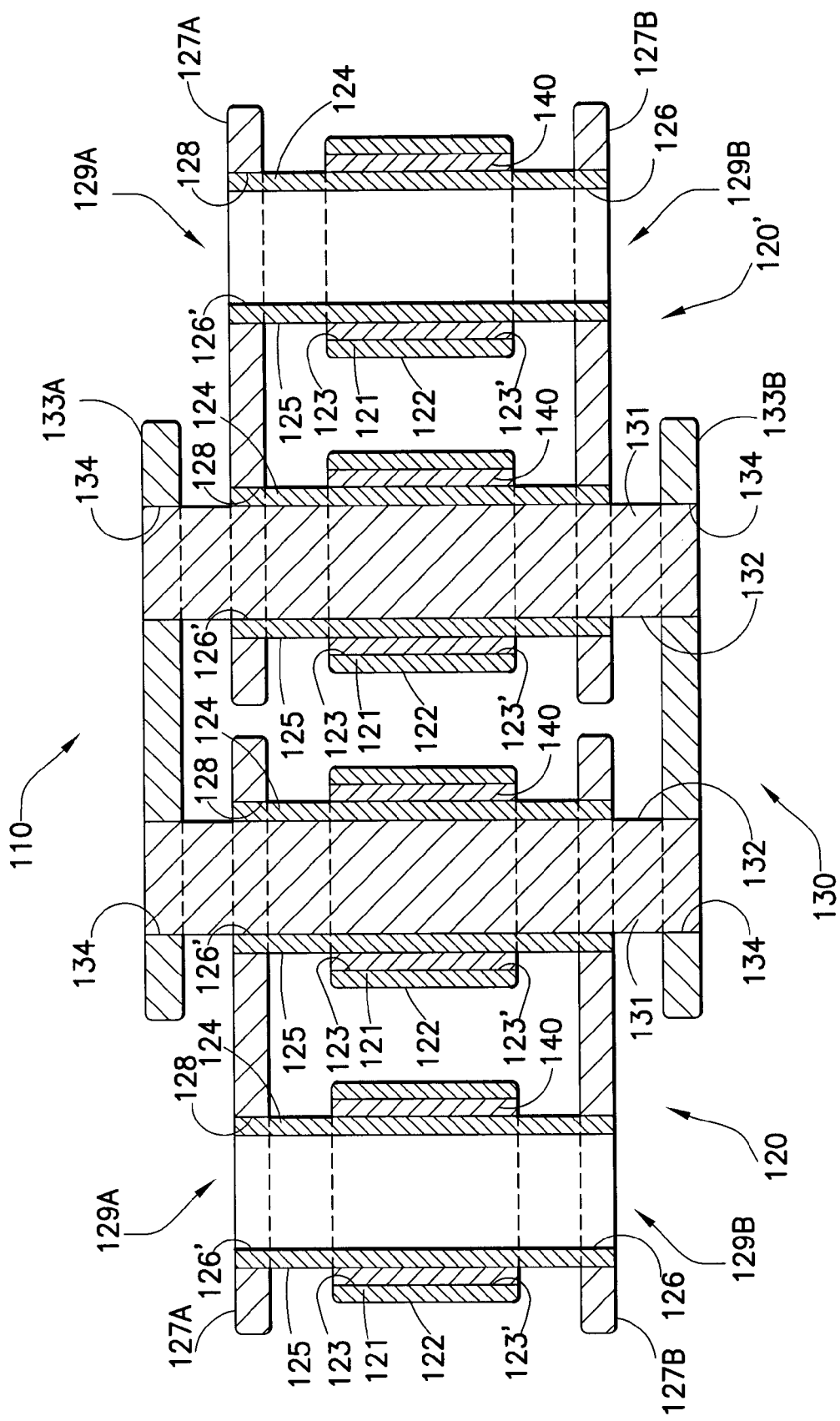
FIG. 3 is a cross sectional view of a portion of a conveyor chain including a bearing in accordance with the disclosed subject matter.
Figure 4:
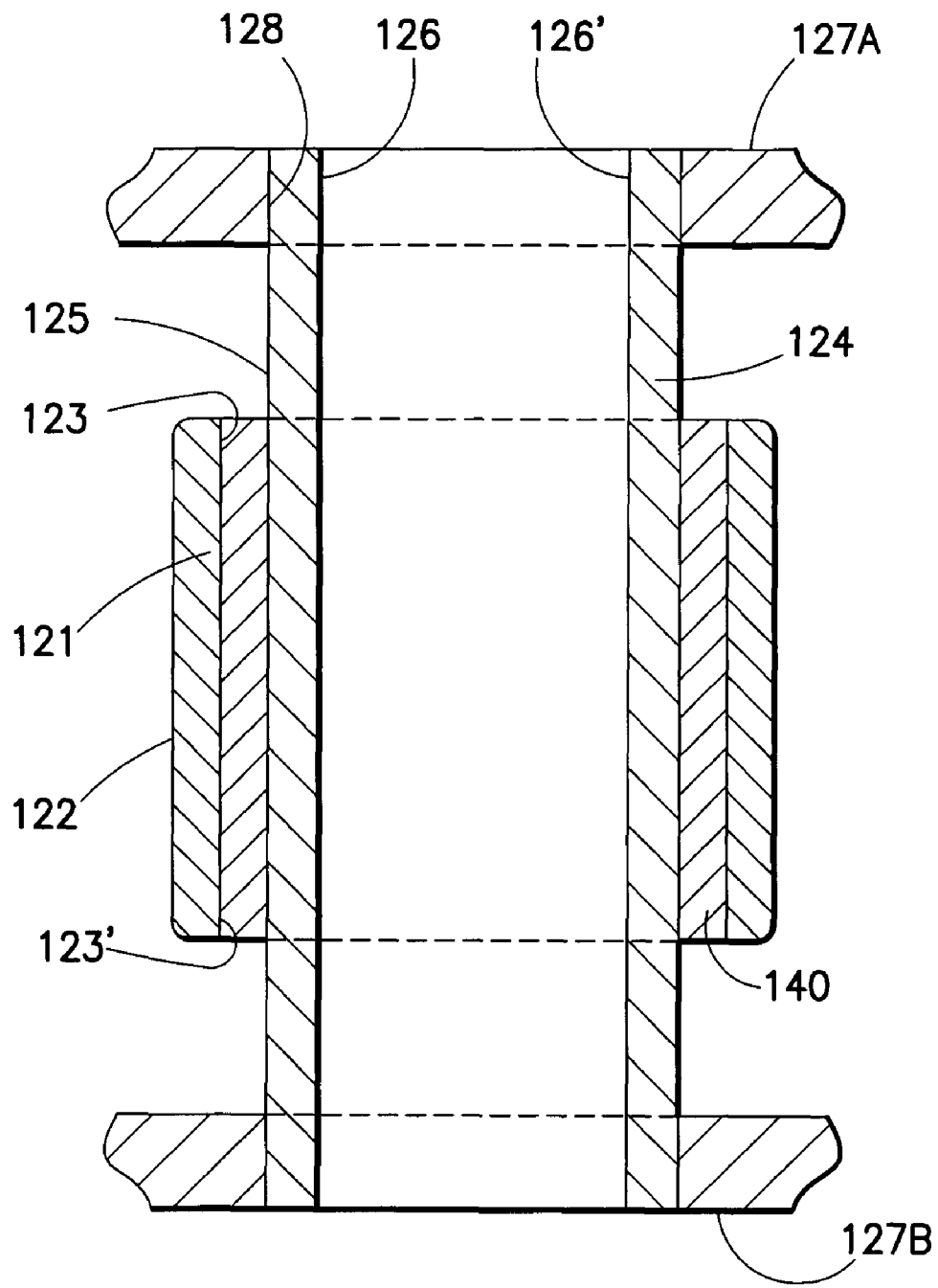
FIG. 4 is an enlarged partial cross sectional view a portion of the conveyor chain of FIG. 3.

As illustrated in FIGS. 3 and 4, a portion of a conveyor chain 110 includes two roller links 120 and 120' coupled by a connecting link 130. Each roller link 120 and 120' include two rollers 121 having an exterior surface 122 for supporting a product to be conveyed and a substantially cylindrical bore 123 extending therethrough, which defines an interior surface 123' of the roller. As used herein, the term "roller" means a material or an outer covering on a bearing 140 that supports a product to be conveyed. Roller 121 may be made of any material, including, but not limited to metal, plastic, rubber, or the like, depending on the application.

Each roller link 120 and 120' includes two chain pins 124 having exterior surfaces 125 and chain pin bores 126 extending therethrough, which define an interior surface 126' of the chain pin. Chain pin 124 extends through, and is rotatably coupled to, substantially cylindrical bore 123 of roller 121.

Two chain pins 124 are disposed between parallel facing chain plates 127A and 127B. In particular, exterior surfaces 125 of chain pins 124 engage respective chain plate bores 128 formed in chain plates 127A and 127B. Chain plate bores 128 are adapted to receive opposing ends of chain pin 124.

Still referring to FIGS. 3 and 4 and as discussed in detail below, a bearing 140 is disposed in substantially cylindrical bore 123 of each roller 121. FIGS. 3 and 4 illustrate rollers 121, having bearings 140 disposed therein, mounted for rotation on each of chain pins 124.

Bearing 140 may be any type of bearing adaptable for use in conveyor chain 110. Examples of bearing 140 include, but are not limited to journal bearings, ball bearings, roller bearings, and the like.

Referring to FIG. 3, roller links 120 and 120' are pivotally coupled to one another by connecting link 130. In particular, connecting link 130 includes two link pins 131 having a link pin exterior surface 132. In one embodiment, link pins 131 are solid cylinders; however, it is contemplated that the link pins may be hollow or have a bore extending therethrough (not shown).

Connecting link 130 includes a pair of parallel facing link plates 133A and 133B each having two link pin bores 134 disposed therein. Parallel facing link plates 133A and 133B are positioned on opposing sides 129A and 129B of roller links 120 and 120' such that chain plate bores 128 are coaxial with respective link pin bores 134. Link pin 131 extends through chain pin bore 126 and chain plate bore 128. Opposing ends of link pins 131 are coupled to parallel facing link plates 133 by engagement of link pin exterior surface 132 with link pin bores 134.

While conveyor chain 110 has been shown and described with roller 121, it is contemplated that the conveyor chain may be utilized without the roller in some embodiments. In embodiments not including roller 121, bearing 140 is rotatably coupled with chain pin 124. In such an embodiment, roller 121 supports a product to be conveyed through s system employing conveyor chain 110.

Figure 5:
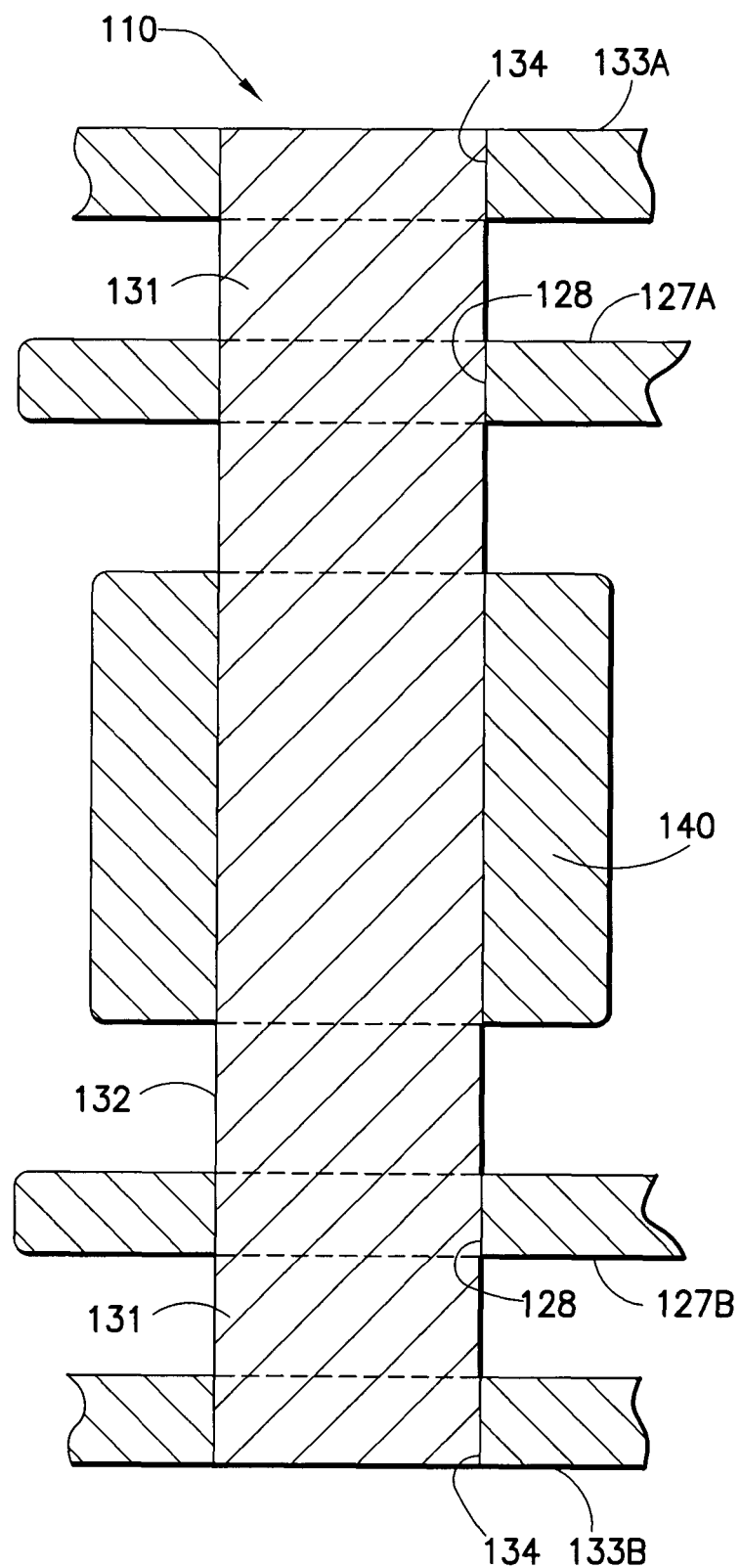
FIG. 5 is an enlarged partial cross section view of a conveyor chain including a bearing in accordance with the disclosed subject matter.

Additionally, and as shown in FIG. 5, in some embodiments conveyor chain 110 may not utilize chain pin 124 to connect parallel facing chain plates 127A and 127B in sections of the conveyor chain that utilize link pins 131. As shown in FIG. 5, parallel facing link plates 133A and 133B and chain plates 127A and 127B are coupled solely by link pin 131. In this embodiment, link pin 131 extends through bearing 140 and chain plate bore 128 in chain plates 127A and 127B. Exterior surface 132 of link pin 131 engages link pin bores 134 in parallel facing link plates 133A and 133B. As discussed in more detail below, a low friction liner material 144 may be disposed on surfaces of bearing 140, link pin 131, link pin bores 134 or chain plate bores 128.

While a single row of roller links 120, 120' and connecting links 130 has been described, the disclosed subject matter is not limited in this regard as more than one row of roller links 120, 120' and connecting links 130 secured side by side to form multiple rows of roller links 120, 120' and connecting links 130 are also adaptable to the use of the bearings 140. While each roller link 120, 120' is described as having two rollers 121, the subject matter disclosed herein is not limited in this regard as the conveyor chain is adaptable to variations with more than two rollers per roller link.

Bearing 140 is generally shown in FIGS. 6-8. As shown in FIGS. 6 and 7, bearing 140 includes a generally tubular body portion 141 defining an exterior surface 142 of the bearing and an interior surface 143 of the bearing. Bearing 140 also includes low friction liner material 144 secured to interior surface 143 of the bearing. Low friction liner material 144 defines a substantially cylindrical interior low friction liner material 144' and a backing 144". The term "low friction" as used herein means characteristics that facilitate the rotation and slidable engagement of the components are maintained without addition of a lubricating agent such as oil or grease. The backing 144" can be made from stainless steel, carbon steel, aluminum, or the like.

In one embodiment, bearing 140 is manufactured from stainless steel, however, the bearing may also be manufactured from other materials known in the art, including, but not limited to ceramics, brass, bronze, polymers, composites and aluminum.

FIGS. 6-8 illustrate low friction liner material 144 secured to interior surface 143 of bearing 140. However, it is also contemplated that low friction liner material 144 may be secured to other surfaces of bearing 140, chain pin 124, link pin 131, roller 121 or combinations thereof. For example, it is contemplated that low friction liner material 144 may be secured to exterior surface 125 of chain pin 124, exterior surface 142 of bearing 140, exterior surface 132 of link pin 131, interior surface 123' of roller 121 and combinations thereof, either independently of or in conjunction with securing the low friction liner material to interior surface 143 of the bearing.

In one embodiment, low friction liner material 144 is secured to any of the above mentioned surfaces by bonding using temperature and pressure. One example of bonding is an adhesive bonding process.

Low friction liner material 144 may be any material having low friction characteristics or qualities. In one example, low friction liner material 144 is a woven fabric. The woven fabric may include polytetrafluoroethylene (PTFE) having a material interwoven therewith. The material interwoven with the PTFE may include a polyester material and/or glass material. The material interwoven with the PTFE may enhance bondability of liner material 144 any surface it is secured on. In one example, liner material 144 is manufactured from Fabroid®, in particular Fabroid G, which is commercially available from RBC Bearings, Oxford, Conn., United States. Another type of liner that could be used in addition to Fabroid® is Fiberglide, which is also commercially available from RBC Bearings.

Still referring to FIGS. 6-8, exterior surface 142 of bearing 140 includes a taper 145 disposed on opposing ends 147 and 148 of tubular body 141.

As shown in FIGS. 6 and 7, one embodiment of bearing 140 includes a longitudinal split 146 extending through tubular body portion 141 and low friction liner material 144 between opposing ends 147 and 148 of the bearing.

FIG. 8, which is a cross-sectional view along line 8-8 of FIG. 7 illustrates an embodiment of bearing 140 that includes low friction liner material 144 secured on interior surface 143 of the bearing.

Figure 9:
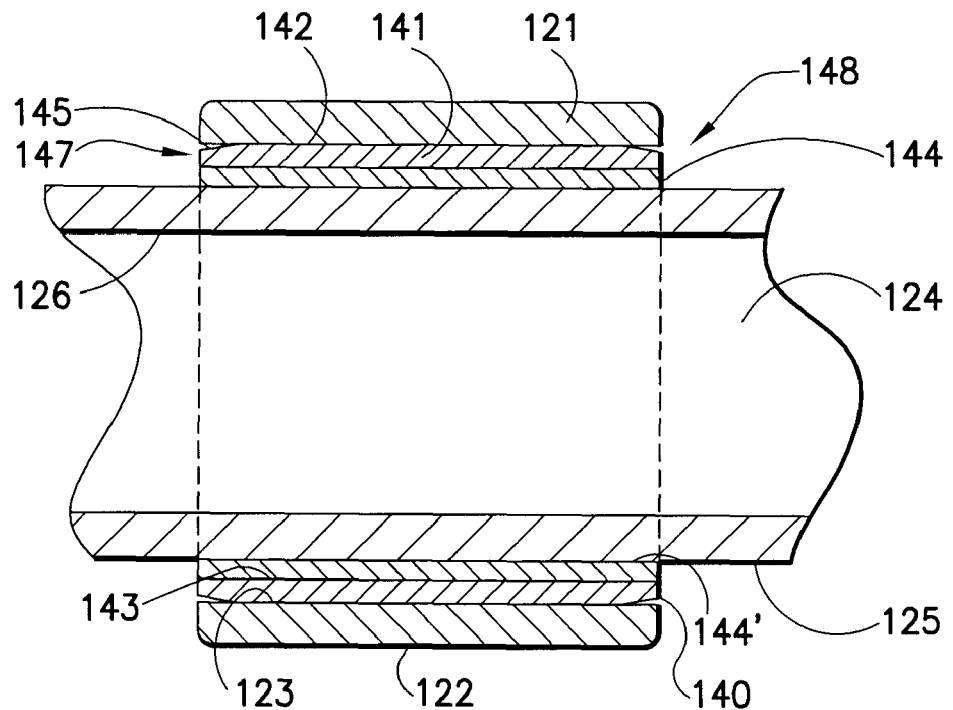
FIG. 9 is a cross section view of the bearing, roller and chain pin.

Referring to FIG. 9, bearing 140 of FIG. 8 is illustrated with chain pin 124 extending through the bearing so that the bearing surrounds exterior surface 125 of chain pin 124. Bearing 140 is itself surrounded by interior surface 123' of roller 121. Specifically, chain pin 124 extends through substantially cylindrical bore 123 of roller 121 so exterior surface 125 of chain pin 124 is facing interior surface 123' of the roller. Bearing 140 is disposed between exterior surface 125 of chain pin 124 and interior surface 123' of roller 121.

In FIG. 9, low friction liner material 144 is secured to interior surface 143 of bearing 140. However, as noted above, it is contemplated that low friction liner material 144 may be secured to exterior surface 125 of chain pin 124, exterior surface 142 of bearing 140, exterior surface 132 of link pin 131, interior surface 123' of roller 121 and combinations thereof, either independently of or in conjunction with securing the low friction liner material to interior surface 143 of the bearing.

Still referring to FIG. 9, exterior surface 142 of bearing 140 engages substantially cylindrical bore 123 of roller 121. During operation of the conveyor chain, as roller 121 rotates, low friction liner material surface 144' slidingly engages exterior surfaces 125 of chain pin 124. Low friction liner material 144 and its low friction liner surface 144' eliminates or reduces the need for lubricants such as grease and oil as the low friction liner material provides lubrication necessary for rolling engagement between exterior surfaces 125 of chain pin 124 and the low friction liner material surface. Low friction liner material 144 has properties and characteristics sufficient to withstand high loads with insignificant wear. Thus, bearing 140 and low friction liner material 144 are operational for extended life when compared to prior art bearings.

Figure 10:
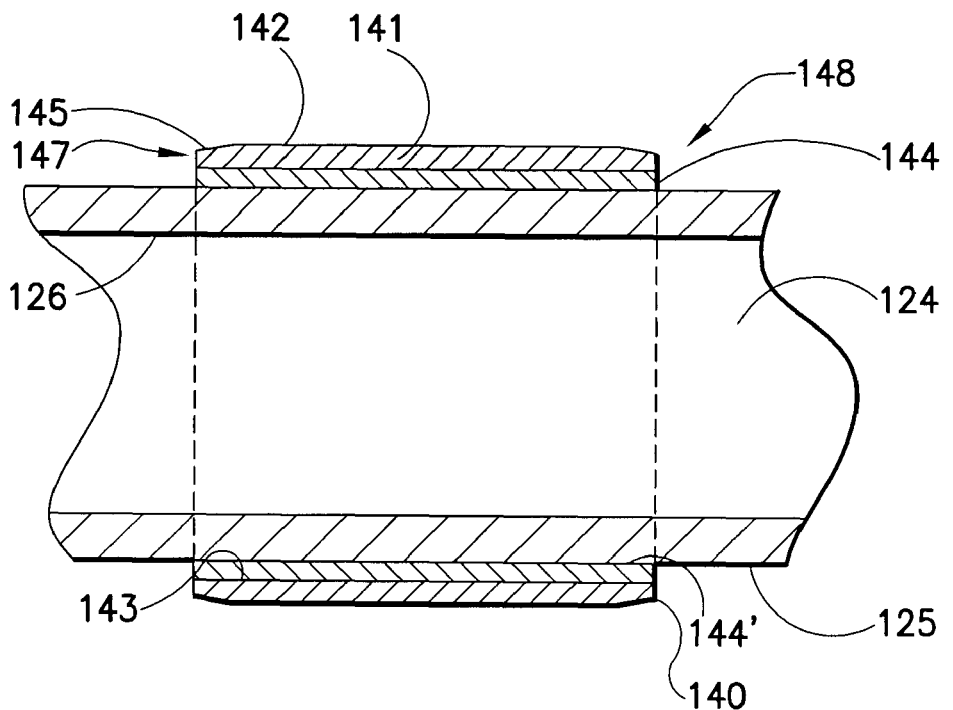
FIG. 10 is a cross section view of the bearing and roller.

In FIG. 10, low friction liner material 144 is secured to interior surface 143 of bearing 140. However, roller 121 is not present in this embodiment, and therefore, bearing 140 is not disposed in substantially cylindrical bore 123 of roller 121.

Still referring to FIG. 10, exterior surface 125 of chain pin 124 engages low friction liner surface 144'. During operation of the conveyor chain, as chain pin 124 rotates, low friction liner material surface 144' slidingly engages exterior surfaces 125 of chain pin 124. Low friction liner material 144 and its low friction liner surface 144' eliminates or reduces the need for lubricants such as grease and oil as the low friction liner material provides lubrication necessary for rolling engagement between exterior surfaces 125 of chain pin 124 and the low friction liner material surface.

While bearing 140 is illustrated in FIGS. 3-10 to be disposed between roller 121 and chain pin 124, the disclosed subject matter is not limited in this regard as the bearing may also be disposed between link pin 131 and chain pin 124 and combinations thereof. Further still, and as noted above, conveyor chain 110 may also be utilized without roller 121.

Figure 11:
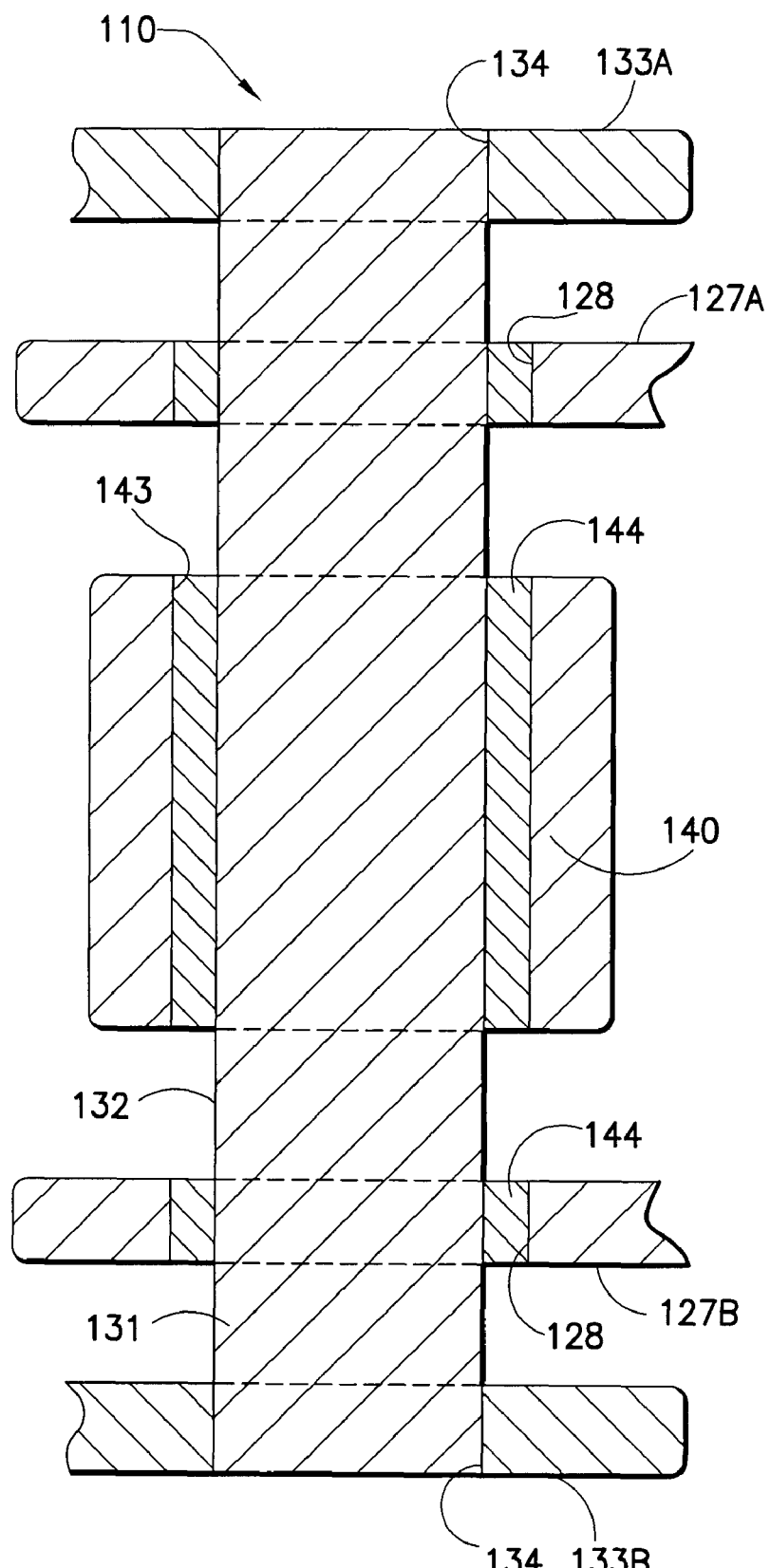
FIG. 11 is an enlarged partial cross section view of a conveyor chain including a bearing having a low friction liner secured thereto.

Additionally, as discussed above and shown in FIG. 5, bearing 140 may be utilized in an embodiment employing solely link pin 131 to connect parallel facing link plates 133A and 133B. As shown in FIG. 11, link pin 131 connects parallel facing link plates 133A and 133B. Link pin 131 extends through generally tubular body portion 141 (not shown) of bearing 140. In FIG. 11, low friction liner material 144 is disposed on interior surface 143 (not shown) of bearing 140 as well as chain plate bores 128. However, it is also contemplated that low friction liner material 144 may be disposed on the entire length of exterior surface 132 of link pin 131. Low friction liner material 144 may also be disposed in link pin bores 134.

Figure 12:
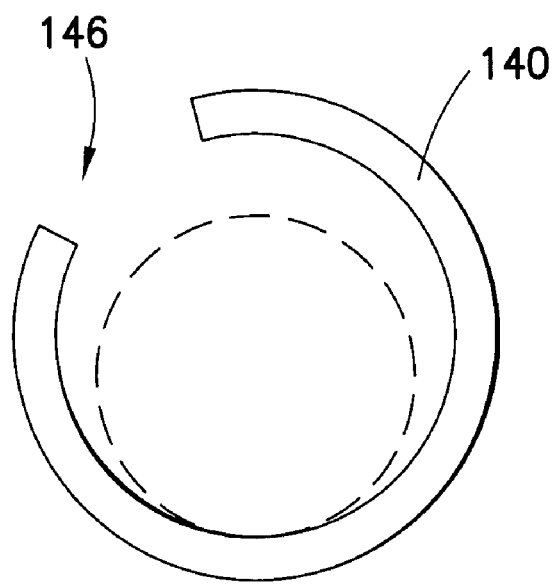
FIG. 12 is an end view of the bearing in a relaxed state.
Figure 13:
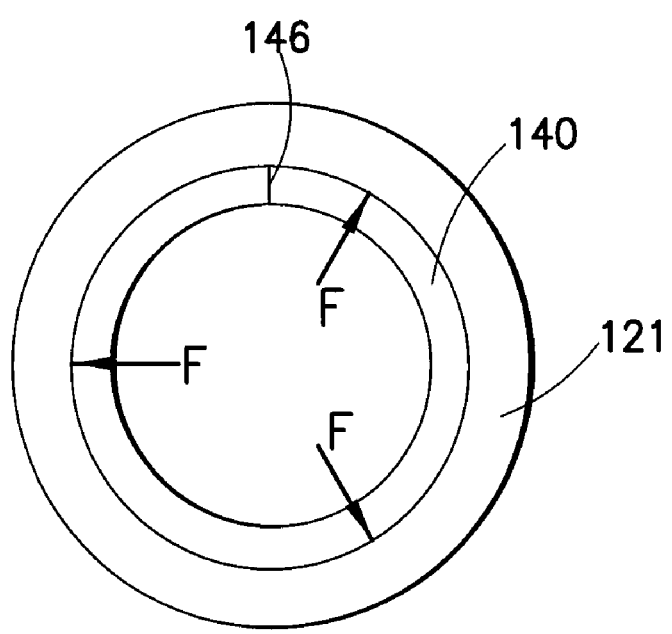
FIG. 13 is an end view of the bearing installed in a roller.

Referring to FIG. 12, bearing 140 is illustrated in a relaxed state prior to installation in roller 121. In the relaxed state, split 146 is open causing bearing 140 to be out of round. Referring to FIG. 13, when installed in roller 121, bearing 140 is compressed causing split 146 to close, which causes the bearing to conform to substantially cylindrical bore 123 of roller 121. When installed in roller 121, bearing 140 imparts an outwardly directed radial force F on substantially cylindrical bore 123 to removably secure the bearing to the roller.

In general, a low friction conveyor chain is manufactured by providing and assembling the components discussed herein. It is contemplated that the various components may be assembled in any sequence to facilitate the manufacture of the conveyor chain.

Specifically, a low friction conveyor chain may be manufactured by providing chain pin 124 and disposing the chain pin in generally tubular portion 141 of bearing 140. As shown in FIG. 3, chain pin 124 extends through bearing 140 so that each end of the chain pin engages a chain plate bore 128.

In some embodiments, roller 121 is utilized to manufacture the conveyor chain. Chain pin 124 is disposed in substantially cylindrical bore 123 of roller 121. Bearing 140 is disposed between exterior surface 15 of chain pin 124 and interior surface 123' of roller 121.

In one example of manufacturing a low friction conveyor chain, low friction liner material 144 is secured to any surface of chain pin 124, bearing 140, roller 121, or combinations thereof. For example, low friction liner material 144 may be secured to interior surface 143 of bearing 140, exterior surface 142 of bearing 140, exterior surface 125 of chain pin 124, interior surface 123 of roller 121, or combinations thereof.

Manufacture of a low friction conveyor chain may also include, when necessary, disposing link pin 131 through chain pin bore 126 so opposing ends of the link pin engage link pin bore 134 of connecting link 130.

While manufacture of a single row of roller links 120, 120' and connecting links 130 has been described, the disclosed subject matter is not limited in this regard as the manufacture of the conveyor chain 110 may include more than one row of roller links 120, 120' and connecting links 130 secured side by side to form multiple rows of roller links 120, 120' and connecting links 130 are also adaptable to the use of bearings 140. While each roller link 120, 120' is described as having two rollers 121, the subject matter disclosed herein is not limited in this regard as conveyor chain 110 is adaptable to variations with more or less than two rollers 121 per roller link.

Although the disclosed subject matter has been described with reference to certain embodiments thereof, it should be noted that other variations and modifications may be made, and it is intended that the following claims cover the variations and modifications within the true scope of the disclosed subject matter.

What is claimed is:

1. A conveyor chain bearing assembly comprising:
a tubular body defining an exterior surface and having a bore extending therethrough and defined by an interior surface;
a chain pin extending through said bore;
a woven low friction liner secured to at least one of said exterior surface, said interior surface and said chain pin
said bearing assembly including a longitudinal split extending through said tubular body and said woven low friction liner and between opposing ends of said tubular body and said woven low friction liner, such that during installation, said tubular body and said woven low friction liner can be compressed; and
wherein during operation, said tubular body sustains loads imposed by product being conveyed.

2. The conveyor chain bearing assembly of claim 1, further comprising a roller defining an exterior surface and having a bore extending therethrough and defined by an interior surface, wherein said tubular body extends through said roller bore and wherein during operation, said roller exterior surface rotatably engages the product being conveyed.

3. The conveyor chain bearing assembly of claim 2, wherein said woven low friction liner is secured to said roller interior.

4. The conveyor chain bearing assembly of claim 1, wherein said woven low friction liner material comprises:
polytetrafluoroethylene (PTFE); and
a material interwoven with said PTFE, said material selected from a polyester material, a glass material, or a combination thereof.

5. The conveyor chain bearing assembly of claim 1, wherein said bearing comprises stainless steel.

6. A conveyor chain comprising:
at least one roller link moveably connected to at least one connecting link;
each of said roller links including at least one chain pin and two parallel facing chain plates, each of said at least one chain pins being disposed between said two parallel facing chain plates, each of said parallel facing chain plates having at least one bore extending therethrough and defined by an interior surface, said chain plate bores having opposing ends of each of said at least one said chain pins positioned therein;
each of said connecting links including at least one link pin and two parallel facing link plates, said at least one link pin and said at least one chain pin being disposed between said two parallel facing link plates, each of said parallel facing link plates having at least one bore extending therethrough and defined by an interior surface, said link pin bores having opposing ends of said link pin positioned therein;
at least one conveyer chain bearing rotatably mounted on one of said at least one chain pins, each of said at least one conveyor chain bearings comprising:
at least one tubular body defining an exterior surface and having a bore extending therethrough and defined by an interior surface, said chain pin and said link pin extending through said bore of said tubular body, and
a woven low friction liner secured to at least one of said tubular body exterior surface, said tubular body interior surface, said chain pin, said link pin, said chain plate bore and said link plate bore;
said at least one conveyor chain bearing including a longitudinal split extending through said tubular body and said woven low friction liner and between opposing ends of said tubular body and said woven low friction liner, such that during installation, said tubular body and said woven low friction liner can be compressed; and
wherein during operation, said tubular body sustains loads imposed by product being conveyed.

7. The conveyor chain of claim 6, further comprising a roller defining an exterior surface and having a bore extending therethrough and defined by an interior surface, wherein said tubular body extends through said roller bore; and
wherein during operation, said roller exterior surface rotatably engages the product being conveyed.

8. The conveyor chain of claim 7, wherein another woven low friction liner is secured to said roller interior surface.

9. The conveyor chain of claim 6, wherein said tubular body comprises stainless steel.

10. The conveyor chain of claim 6, wherein said woven low friction liner comprises:
polytetrafluoroethylene (PTFE); and
a material interwoven with said PTFE, said material selected from a glass material, a polyester material or a combination thereof.

11. The conveyor chain of claim 6, wherein at least one of said at least one conveyor chain bearings is rotatingly mounted on each of said chain pins.

* * * * *